United States Patent
Robarge et al.

(10) Patent No.: US 9,260,000 B2
(45) Date of Patent: Feb. 16, 2016

(54) SYNCHRONOUS SPEED DISCONNECT OF A GENERATOR FOR A HYBRID ELECTRIC VEHICLE

(71) Applicant: FORD GLOBAL TECHNOLOGIES, LLC, Dearborn, MI (US)

(72) Inventors: John E. Robarge, Saline, MI (US); Craig M. Renneker, Northville, MI (US); Brian R. Light, Flat Rock, MI (US); Norman J. Bird, Plymouth, MI (US); Matthew S. Eiszler, Pinckney, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/060,905

(22) Filed: Oct. 23, 2013

(65) Prior Publication Data

US 2015/0111678 A1   Apr. 23, 2015

(51) Int. Cl.
| | |
|---|---|
| *F16H 3/44* | (2006.01) |
| *B60K 6/42* | (2007.10) |
| *B60W 10/08* | (2006.01) |
| *B60W 10/11* | (2012.01) |
| *B60W 20/00* | (2006.01) |
| *B60K 6/387* | (2007.10) |
| *B60K 6/365* | (2007.10) |
| *F16H 3/72* | (2006.01) |

(52) U.S. Cl.
CPC . *B60K 6/42* (2013.01); *B60K 6/365* (2013.01); *B60K 6/387* (2013.01); *B60W 10/08* (2013.01); *B60W 10/11* (2013.01); *B60W 20/30* (2013.01); *F16H 3/724* (2013.01); *Y10S 903/902* (2013.01)

(58) Field of Classification Search
CPC ........ B60K 6/42; B60W 10/11; B60W 10/08; B60W 20/30
USPC ................................ 475/303, 5, 302; 477/3, 5
See application file for complete search history.

(56) References Cited

U.S. PATENT DOCUMENTS

| | | | |
|---|---|---|---|
| 6,645,105 B2 | 11/2003 | Kima | |
| 7,686,112 B2 | 3/2010 | Shiiba | |
| 8,187,146 B2 | 5/2012 | Allgaier et al. | |
| 8,512,187 B2* | 8/2013 | Puiu et al. | 475/5 |
| 8,771,139 B2* | 7/2014 | Ideshio et al. | 477/8 |
| 8,784,245 B2* | 7/2014 | Ideshio et al. | 475/5 |
| 2006/0201268 A1* | 9/2006 | Fink et al. | 74/339 |
| 2007/0093341 A1* | 4/2007 | Supina et al. | 475/5 |
| 2010/0252386 A1* | 10/2010 | Hiraiwa | 192/53.32 |
| 2011/0061954 A1 | 3/2011 | Singh et al. | |
| 2011/0143874 A1* | 6/2011 | Tangl | 475/5 |
| 2011/0174586 A1* | 7/2011 | Westerberg | 192/53.32 |
| 2012/0129649 A1 | 5/2012 | Kaltenbach | |
| 2013/0324341 A1* | 12/2013 | Cho et al. | 475/5 |

* cited by examiner

*Primary Examiner* — David J Hlavka
(74) *Attorney, Agent, or Firm* — David B. Kelley; MacMillan, Sobanski & Todd, LLC

(57) ABSTRACT

A drive system includes first and second power sources, a planetary gearset including an output, and first and second inputs driveably connected, respectively, to the first and second power sources, a pinion supported for rotation, and a synchronizer for alternately releasing a drive connection between the pinion and output and substantially synchronizing a speed of the pinion and a speed of the output before driveably connecting the pinion and the output.

15 Claims, 3 Drawing Sheets

SYNCHRONOUS SPEED DISCONNECT OF A GENERATOR FOR A HYBRID ELECTRIC VEHICLE

BACKGROUND OF THE INVENTION

1. Field of the Invention

This invention relates generally to an apparatus for Hybrid transmission generator selectable mechanical disconnect with synchronous engagement.

2. Description of the Prior Art

In order to realize the benefit of a hybrid electric vehicle transmission running in electric mode, there is an energy loss benefit from disconnecting an electric generator from the rotating gear train, thereby reducing in magnetic, drag and windage losses.

A need exists in the industry for a device or technique that is able to disconnect and reconnect the generator and vehicle wheels depending on the power demanded by the vehicle operator regardless of the vehicle speed.

SUMMARY OF THE INVENTION

A drive system includes first and second power sources, a planetary gearset including an output, and first and second inputs driveably connected, respectively, to the first and second power sources, a pinion supported for rotation, and a synchronizer for alternately releasing a drive connection between the pinion and output and substantially synchronizing a speed of the pinion and a speed of the output before driveably connecting the pinion and the output.

The synchronizer provides the ability to run in full electric mode or split mode within the same transmission, and allows a disconnection and connection to be made between the vehicle's wheels and the gearset's output at zero vehicle speed or any vehicle speed.

The drive system produces enhanced fuel economy save by eliminating drag, magnetic and windage losses associated with spinning the electric generator when it is not used for power generation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
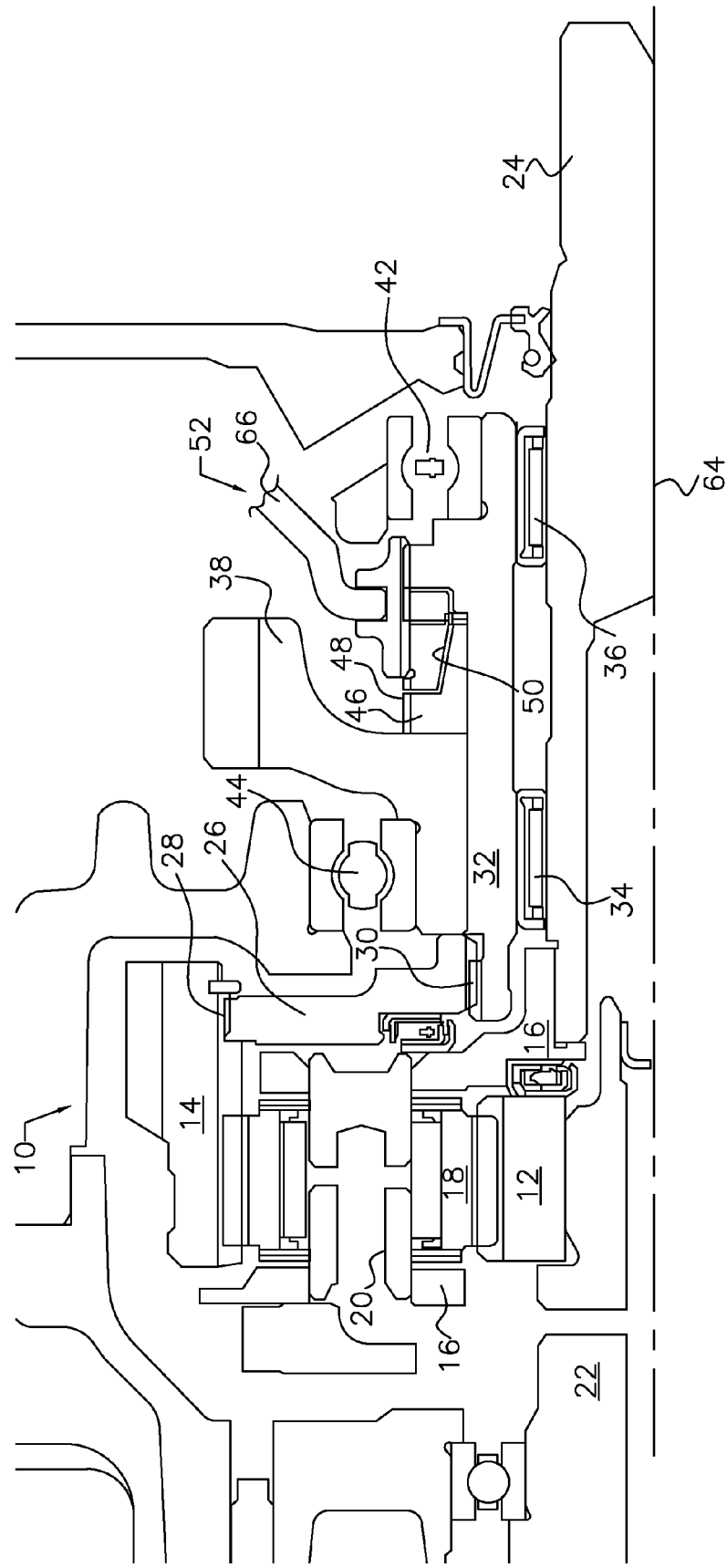
FIG. 1 is a cross sectional view showing a powersplit gearset of a hybrid electric vehicle whose output is disconnected from the vehicle's powertrain.

Referring first to FIG. 1, a powersplit gearset 10, of the type used in a hybrid electric vehicle, includes a sun gear 12, ring gear 14, planet pinion carrier 16, and planet pinions 18 supported on a pinion shaft 20 secured to the carrier. The planet pinions 18 are in continual meshing engagement with the ring gear 14 and sun gear 12.

The sun gear 12 is secured to a shaft 22, which is driveably connected to the rotor or an electric generator through spline connection 13. The carrier 16 is secured to a shaft 24, which is driveably connected to a power source, such as an internal combustion engine. The ring gear 14 is secured through a disc 26 and spline connections 28, 30 to a shaft 32.

Shaft 32 is supported for rotation on shaft 24 by needle bearings 34, 36. Shaft 32 is formed at its outer periphery with axially-directed teeth 33.

A pinion 38, journalled on shaft 32, is supported for rotation on bearings 42, 44. Pinion 38 includes a ring 46, which is secured by a weld 47 to the gear, is formed with a conical surface 50, and is formed at its outer periphery with axially-directed teeth 48 aligned with teeth 33.

A synchronizer 52 includes a synchronizing ring 54 formed at its outer periphery with axially-directed teeth 56 aligned with teeth 33 and 48, and formed with a conical surface 58 facing conical surface 50. Synchronizer 52 also includes a synchronizer sleeve 60 formed with internal teeth 62 aligned with teeth 33, 48, 56.

Figure 2:
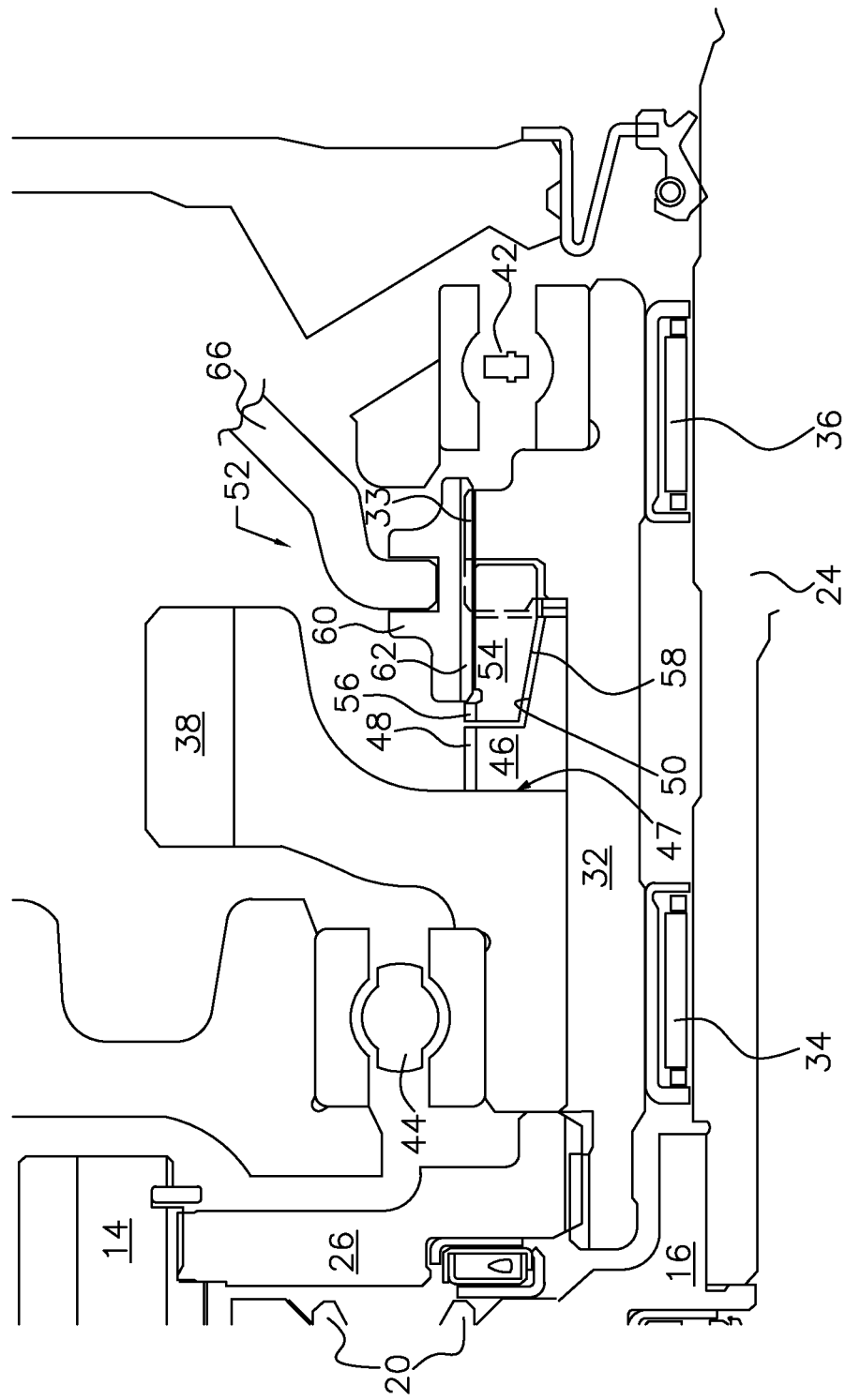
FIG. 2 is a cross sectional view showing in a larger scale the synchronizer sleeve positioned as in FIG. 1.
Figure 3:
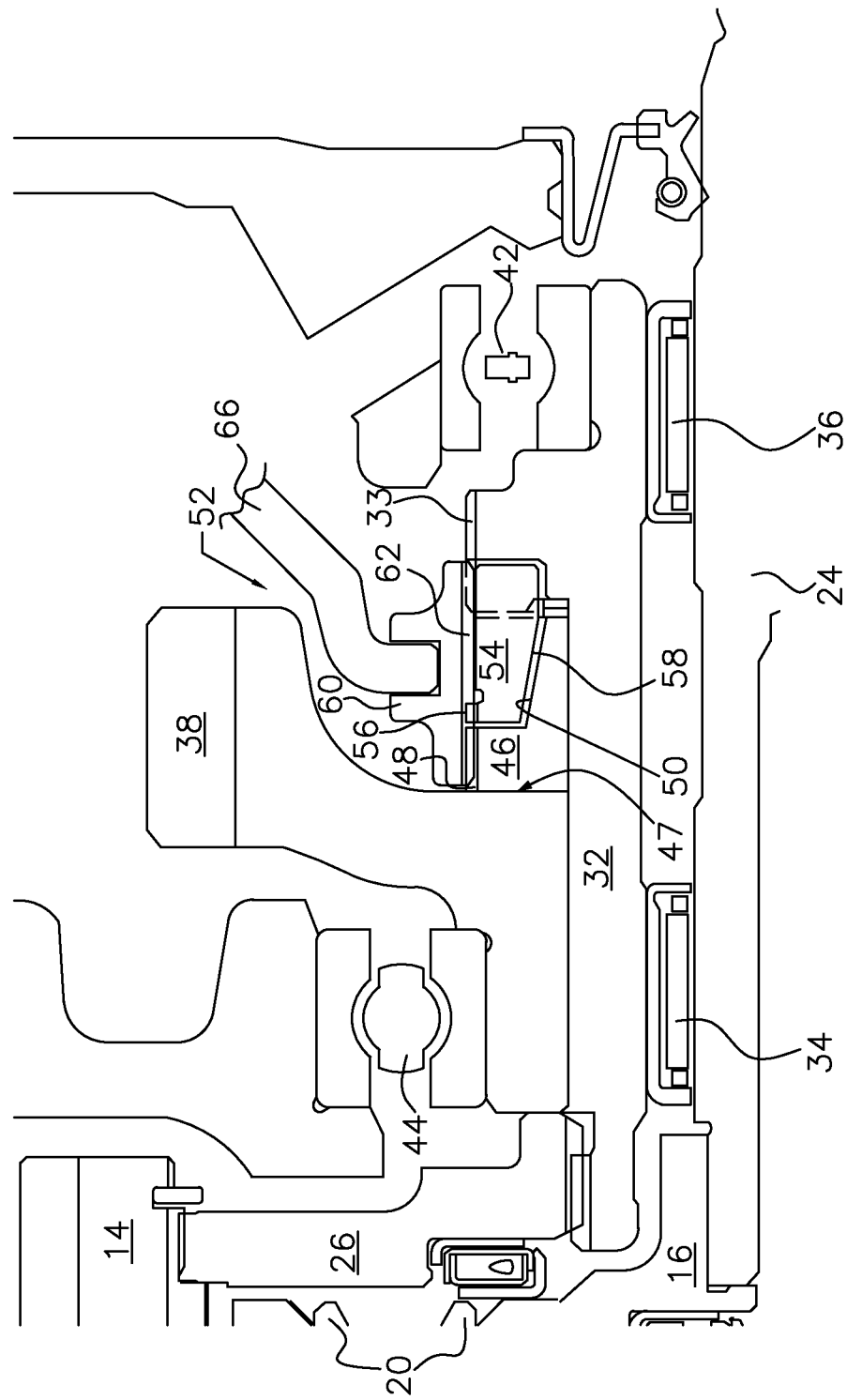
FIG. 3 shows the powersplit gearset's output connected through the synchronizer to the vehicle's powertrain.

Synchronizer sleeve 60, which is continually engaged with teeth 33, is engaged by a shift fork 66, which moves synchronizer sleeve 60 axially leftward along axis 64 into engagement with teeth 48, 56. As sleeve 60 moves leftward from the position of FIGS. 1 and 2 to the position of FIG. 3, synchronizing ring 54 is forced leftward by movement of sleeve 60, thereby forcing conical surfaces 50, 58 into frictional contact, which contact tends to substantially synchronize, within a speed range of about 50 rpm, the speeds of the output of gearset 10, i.e., ring gear 14, disc 26 and shaft 32, with the speed of pinion 38. Pinion 38 is engaged with a gear (not shown) that is driveably connected to an interwheel differential (not shown), which transmits power between the vehicle wheels and the output of gearset 10. The carrier 16 of gearset 10 carries engine torque, transmitted from the engine to the carrier on shaft 24, and sun gear 12 carries electric generator torque, transmitted from the generator to the sun gear on shaft 22.

Synchronizer 52 permits disconnecting the generator from the power flow to the vehicle wheels when the vehicle is running on battery power only, thereby reducing losses. The electric generator can be synchronously engaged with vehicle's wheels through synchronizer 52 at vehicle speed when power requirements warrant additional energy, i.e., running the engine and generator for a split mode.

In accordance with the provisions of the patent statutes, the preferred embodiment has been described. However, it should be noted that the alternate embodiments can be practiced otherwise than as specifically illustrated and described.

The invention claimed is:

1. A drive system, comprising:
   first and second power sources;
   a planetary gearset including an output, and first and second inputs driveably connected, respectively, to the first and second power sources via first and second shafts, respectively;
   a third shaft journalled on the first shaft;
   a pinion journalled on the third shaft for rotation;
   a synchronizer for alternately releasing a drive connection between the pinion and output, and substantially synchronizing a speed of the pinion and a speed of the output before driveably connecting the pinion and the output.

2. The drive system of claim 1 wherein:

the output is a ring gear, the first input is a carrier, the second input is a sun gear; and the planetary gearset further comprises:

planet pinions supported for rotation on the carrier and meshing with the sun gear and the ring gear.

3. The drive system of claim 1, further comprising:

first and second needle bearings located in a radial space between the first shaft and the third shaft for supporting the third shaft on the first shaft.

4. The drive system of claim 1, wherein:

the pinion includes a first conical surface;

the synchronizer includes a synchronizing ring formed with a second conical surface that produces frictional contact with the first conical surface, and a sleeve engaged with the third shaft and able to alternately driveably engage and disengage the synchronizing ring and the pinion.

5. The drive system of claim 1, wherein:

the pinion includes a first conical surface;

the synchronizer includes a synchronizing ring formed with a second conical surface that produces frictional contact with the first conical surface, and a sleeve continually engaged with the output and able to alternately driveably engage and disengage the output and the pinion.

6. A drive system, comprising:

an engine;

an electric generator;

a planetary gearset including an output, and first and second inputs driveably connected, respectively, to the engine and generator;

a pinion supported for rotation around an engine driven shaft;

a synchronizer for alternately releasing a drive connection between the pinion and output, substantially synchronizing a speed of the pinion and a speed of the output before driveably connecting the pinion and the output.

7. The drive system of claim 6 wherein:

the output is a ring gear, the first input is a carrier, the second input is a sun gear; and the planetary gearset further comprises:

planet pinions supported for rotation on the carrier and meshing with the sun gear and the ring gear.

8. The drive system of claim 6 further comprising:

the engine driven shaft driveably connected to the engine;

a second shaft driveably connected to the generator;

a third shaft journalled on the engine driven shaft, and the pinion journalled on the third shaft for selective rotation relative to the third shaft.

9. The drive system of claim 8, further comprising:

first and second needle bearings located in a radial space between the engine driven shaft and the third shaft for supporting the third shaft on the engine driven shaft.

10. The drive system of claim 8, wherein:

the pinion includes a first conical surface;

the synchronizer includes a synchronizing ring formed with a second conical surface that produces frictional contact with the first conical surface, and a sleeve engaged with the third shaft and able to alternately driveably engage and disengage the synchronizing ring and the pinion.

11. The drive system of claim 6, wherein:

the pinion includes a first conical surface;

the synchronizer includes a synchronizing ring formed with a second conical surface that produces frictional contact with the first conical surface, and a sleeve continually engaged with the output and able to alternately driveably engage and disengage the output and the pinion.

12. A method for controlling a drive system, comprising:

connecting first and second power sources to first and second inputs, respectively, of a planetary gearset having an output;

driveably connecting a pinion, journalled around a shaft rotationally fixed to the output, to vehicle wheels;

using a synchronizer to release a drive connection between the output and the pinion;

using the synchronizer to substantially synchronize pinion speed and output speed before driveably connecting the pinion and output.

13. The method of claim 12, further comprising:

driving the wheels of the vehicle using power from an electric storage battery;

using the synchronizer to driveably disconnect the first and second power source from pinion.

14. The method of claim 12, further comprising:

using the synchronizer to driveably connect at least one of the first and second power sources to the pinion while vehicle speed is zero.

15. The method of claim 12, further comprising:

using the synchronizer to driveably connect at least one of the first and second power sources to the pinion while vehicle speed is not zero.

* * * * *